United States Patent

Wettstein

Patent Number: 6,098,009
Date of Patent: Aug. 1, 2000

[54] METHOD AND DEVICE FOR CONTROLLING TURBOMACHINES

[75] Inventor: Hans Wettstein, Fislisbach, Switzerland

[73] Assignee: ABB Alstom Power (Switzerland) Ltd, Baden, Switzerland

[21] Appl. No.: 08/956,046

[22] Filed: Oct. 22, 1997

[30] Foreign Application Priority Data

Nov. 15, 1996 [DE] Germany .......................... 196 47 281

[51] Int. Cl.$^7$ ....................................................... F02C 9/00
[52] U.S. Cl. ......................................... 701/100; 702/182
[58] Field of Search .......................... 701/100; 702/182; 60/39.03, 39.091, 660, 39.24, 39.281, 39.3

[56] References Cited

U.S. PATENT DOCUMENTS

| | | | |
|---|---|---|---|
| 4,228,650 | 10/1980 | Camp ................................... | 60/39.091 |
| 4,410,950 | 10/1983 | Toyoda et al. ............................ | 701/99 |
| 4,891,948 | 1/1990 | Kure-Jensen et al. .................... | 60/645 |
| 5,757,641 | 5/1998 | Minto ...................................... | 364/133 |

FOREIGN PATENT DOCUMENTS

| | | |
|---|---|---|
| 0005426 | 11/1979 | European Pat. Off. . |
| 2903039C2 | 6/1988 | Germany . |

Primary Examiner—Michael J. Zanelli
Attorney, Agent, or Firm—Burns, Doane, Swecker & Mathis, L.L.P.

[57] ABSTRACT

A method of controlling turbomachines is specified, a characteristic signal, in particular a performance signal, normally being fed to the controller as a controlled variable, but this performance signal, together with a number of further signals significant of the performance from the plant circuit, forming a signal set in a comparison and selection unit, and the signals from this signal set being compared with one another. The maximum selection among the signals, formed at the same time in the comparison and selection unit 2.1, yields the signal of the controlled variable that is forwarded to the controller 1.1. In addition, monitoring as to whether the performance signal is the maximum signal is performed. In addition, a device for controlling turbomachines according to the method is specified, which device has a control loop 1 for the output of actuating signals for control devices of the plant, the control loop 1 being preceded by a monitoring loop 2 that has a comparison and selection unit 2.1, to which, apart from the performance signal of the control loop 1, at least one further signal significant of the performance is additionally applied, and all these applied signals form a signal set. The comparison and selection unit 2.1 determines the maximum signal from these signal set and the said maximum signal is applied as input signal to a controller 1.1 of the control loop 1 in place of the direct performance signal.

13 Claims, 1 Drawing Sheet

METHOD AND DEVICE FOR CONTROLLING TURBOMACHINES

BACKGROUND OF THE INVENTION

1. Field of the Invention

The invention relates to a method of controlling turbomachines using one or more sets of signals indicating performance parameters of the turbomachines.

2. Discussion of Background

Hitherto, in controlling a turbomachine, that is to say a gas or steam turbine, the performance has been used as the controlled variable for controlling the plant. In this case, a value of the performance that is erroneously too low for any reason may cause a dangerous control movement in the direct of increasing the performance, in that for example the controller, as a result of the erroneous desired/actual deviation, endeavors to set the desired performance by opening the appropriate control element, for example of a fuel valve in the case of gas turbines or of a steam valve in the case of steam turbines. Such an increase in performance is particularly dangerous if it exceeds the plant-typical desired performance and, as a result, can lead to destruction of the plant. Therefore, redundant devices have hitherto been provided in the performance measuring chain, which are intended to prevent erroneously complete failure of a controlled variable. However, such solutions are very complicated and expensive from the point of view of devices and assembly.

SUMMARY OF THE INVENTION

Accordingly, one object of the invention is to provide a novel method of avoiding all these disadvantages. It is based on the object of specifying a method and a device which yield the same safety as redundant devices for the controlled variable, but are significantly more cost-effective.

In accordance with exemplary embodiments of the invention, a method of controlling turbomachines is specified wherein a characteristic signal, in particular a performance signal, which in conventional control systems is normally fed to the controller as a controlled variable, is taken together with a number of further signals significant of the performance from the plant circuit to form a signal set in a comparison and selection unit. The signals from this signal set are compared with one another. The maximum signal in the signal set is forwarded to the controller 1.1 as the controlled variable. In addition, monitoring is performed to determine whether the performance signal or signal reflecting an output performance of the turbomachine is the maximum signal of the signal set. In addition, a device for controlling turbomachines according to the method is specified, which device has a control loop 1 for the output of actuating signals for control devices of the plant. The control loop 1 is preceded by a monitoring loop 2 that has a comparison and selection unit 2.1, to which, apart from the performance signal of the control loop 1, at least one further signal significant of the performance is additionally applied, and all these applied signals form a signal set. The comparison and selection unit 2.1 determines the maximum signal in the signal set. The maximum signal is applied as an input signal to a controller 1.1 of the control loop 1 in place of the direct performance signal, i.e., the characteristic or performance signal.

BRIEF DESCRIPTION OF THE DRAWINGS

A more complete appreciation of the invention and many of the attendant advantages thereof will be realized by referring to the following detailed description in connection with the accompanying drawings, wherein.

Figure 1:
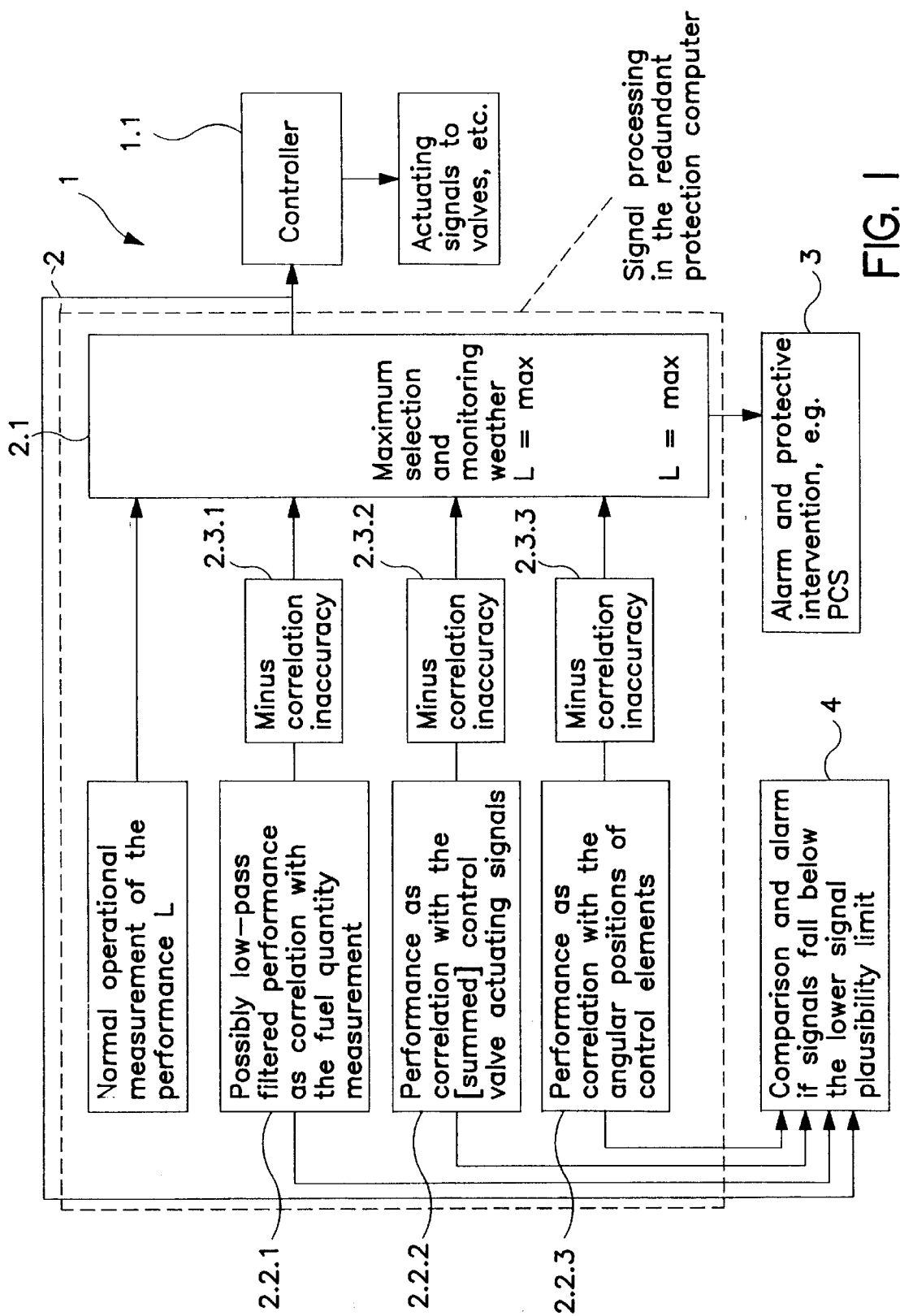
FIG. 1 shows the circuit diagram of the devices which, according to the invention, are required in addition to a normal control loop.

Only those elements which are essential for the understanding of the invention are shown; in particular, that part of the control loop which is known per se and unchanged is not illustrated.

DESCRIPTION OF THE PREFERRED EMBODIMENTS

In a method of controlling turbomachines, as a rule a characteristic signal, in particular a performance signal, is fed to the controller as controlled variable. In the event of an apparent decrease in the performance as the result of a defect in the signal generation or signal transmission, in order that the plant is not readjusted, that is to say controlled to a higher performance, i.e. hence to a performance lying above the desired performance, instead of the previously usual redundant signal loops in the performance measuring chains, the performance signal is combined with a number of further signals significant of the performance from the plant circuit to form a signal set. The signals of this set are compared with one another in a comparison and selection unit, a so-called maximum selection among the signals being performed. This means that the maximum signal of this signal set is found, and this is fed to the controller as a new, effective performance signal, as shown for example in FIG. 1, on the basis of which therefore the plant is controlled. For instance, in the case of a gas turbine at least two of the following signals can preferably be used as such signals significant of the performance: fuel quantity measuring signal, signal of the requested fuel control valve position, compressor pressure signal, exhaust gas temperature signal, signal of the primary control series position, and a computational combination of the above signals. In the case of a steam turbine, it is possible for two of the following signals likewise preferably to be used as additional signals: signal of the steam control valve position, the steam pressure signals upstream and downstream of turbines, signals of the fresh steam temperatures and likewise a computational combination of these. The signals that are used in addition to the normal performance signal, mentioned above and correlated with the performance of the plant are conditioned computationally in such a way that they yield a signal that is comparable with the normal performance signal. Such conditioning measures may also be hand-pass or low-pass filtering or else signal delays. In particular, these additional signals are converted into performance and subjected to a deduction, so that it becomes extremely unlikely that they will exceed the normal performance signal given normal functioning of the performance measurement. This deduction from each conditioned signal significant of the performance is a typical amount for the correlation inaccuracy of the correlation method. In particular, it is ensured in this way that each correlated signal from the signal set is somewhat smaller than the performance signal under normal operating conditions. Together with the maximum selection from this signal set, it is thus ensured that, given normal functioning of the plant and of the monitoring system, it is always the normal performance signal that controls the plant. The additional signals become effective only in the case when this normal performance signal deviates from the performance corresponding to the actual operating state, on the basis of any kind of defect in the performance measuring loop or other relevant devices, in particular if the said signal deviates downward or fails entirely. They control the plant unit the fault in the performance measuring loop, etc, is able to be eliminated. Hence, an immediate rapid shutdown, that is to say an emergency shutdown of the plant, which is always dangerous, is able to be avoided in most cases, which not only avoids operational failure and the costs produced thereby, but also looks after the plant. Although redundant performance measuring loops can also do this, these are significantly more expensive to produce and maintain than the version having the additional signal set. Furthermore, the additional signals are monitored in a suitable way for plausibility of the correlation with the performance, in particular checked for excessively low values. Disturbance of this type indicate a reduced fail-safe security and can be indicated and in general eliminated without interrupting operations. Only the failure of all the signals forces the plant to be stopped. In relation to safety, however, each signal used is individually effective as a protective limit. In the case of gas turbines, the invention avoids excessively high temperatures in the power consumer occurring as a result of performance signal errors.

Referring now to FIG. 1, a device for controlling turbomachines according to the method has a control loop 1 for the output of actuating signals for control devices of the plant, a monitoring loop 2 preceding the control loop 1 and having a comparison and selection unit 2.1, to which, apart from the performance signal of the control loop 1, at least one further signal significant of the performance is additionally applied, all the applied signals forming a signal set. The comparison and selection unit 2.1 determines the maximum signal of this signal set. Its output signal is applied as input signal to a controller 1.1 of the control loop 1 in place of the direct performance signal. In addition, there is connected to the comparison and selection unit 2.1 an alarm circuit 3 to which a signal is applied by the comparison and selection unit 2.1 when it is not the performance signal but a signal significant of the performance from the signal set that is the maximum signal, and hence this is forwarded to the controller 1.1. For its part, this alarm circuit 3 has connected to it an alarm or switch-off device in order to monitor the plant or to set it to part load or switch it off entirely. This monitor can be performed automatically or manually. The monitoring loop 2 has one correlation device each 2.2.i for each supplied signal significant of the performance from the signal set. In said device, the supplied signals significant of the performance are conditioned computationally for the purpose of comparison with the direct performance signal. In particular, this correlation device 2.2.i may also contain band-pass and/or low-pass filters, and possible delay elements. However, it is also possible for a single correlation device to be provided for all the supplied signals significant of the performance, in the case of such an arrangement the conditioning of the additional, correlated signals not being performed in parallel in time but one after another, sequentially and cyclically. In this case, each signal is conditioned in accordance with a separate method and in accordance with criteria and relationships that are specific to this signal.

Each correlation device 2.2.i is additionally assigned a subtraction device 2.3.1 or integrated in it, a typical amount being subtracted as correlation inaccuracy from each conditioned signal significant of the performance in the subtraction device 2.3.i. Hence, each correlated signal from the signal set is somewhat smaller than the performance signal under normal operating conditions. In addition, a signal failure and plausibility testing device 4 is provided, which monitors the signals significant of the performance for signal failure and/or for plausibility of the correlation with the performance signal in relation to excessively low values. This plausibility testing device 4 may be connected to each of the individual correlation devices 2.2.i or to the common correlation device.

The monitoring loop is preferably provided redundantly on the turbine plant. For its part, the latter can be monitored for channel faults and, if such faults occur, these are treated in the same way as the faults in additional signals. They may be indicated and generally eliminated without interrupting operations.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of controlling a turbomachine, a characteristic signal being fed to a controller of the turbomachine as a controlled variable, wherein this characteristic signal, together with a number of further signals significant of the performance of the turbomachine, forms a signal set in a comparison and selection unit, wherein the signals from this signal set are compared with one another, wherein at the same time a maximum selection among the signals and monitoring as to whether the characteristic signal is the maximum signal are performed, and wherein the maximum signal from this signal set is forwarded to the controller.

2. The method of claim 1, wherein the characteristic signal is a performance signal reflecting a performance of the turbomachine.

3. The method as claimed in claim 2, wherein an alarm circuit is activated in the case in which it is not the performance signal but a signal significant of the performance from the signal set that is the maximum signal, and hence this is forwarded to the controller.

4. The method as claimed in claim 3, wherein when the alarm circuit is activated, the alarm circuit triggers one of alarm devices and protective interventions in the turbomachine.

5. The method as claimed in claim 2, wherein the signals significant of the performance from the signal set are conditioned before the comparison with the performance signal, in order to be comparable with the performance signal.

6. The method as claimed in claim 5, wherein, from the conditioned signals significant of the performance, an amount that is typical of the signal in each case is subtracted as correlation inaccuracy, which results in each correlated signal from the signal set being somewhat smaller than the performance signal under normal operating conditions.

7. The method as claimed in claim 1, wherein the signals significant of the performance are monitored for at least one of signal failure and plausibility of the correlation with the performance signal in relation to excessively low values.

8. A device for controlling a turbomachine according to the method of claim 1, having a control loop outputting actuating signals for control devices of the turbomachine, wherein the control loop is preceded by a monitoring loop that has a comparison and selection unit, to which, apart from a performance signal of the control loop, at least one further signal significant of the performance of the turbomachine is additionally applied, all the applied signals forming a signal set, wherein the comparison and selection unit determines the maximum signal from this signal set and the maximum signal is applied as an input signal to a controller of the control loop in place of the performance signal.

9. The device as claimed in claim 8, wherein there is connected to the comparison and selection unit an alarm circuit to which a signal is applied by the comparison and selection unit when it is not the performance signal but a signal significant of the performance from the signal set that is the maximum signal.

10. The device as claimed in claim 9, wherein the alarm circuit activates one of alarm devices and switch-off devices in order to perform one of monitoring the turbomachine, setting the turbomachine to part load, and switching the turbomachine off entirely.

11. The device as claimed in claim 8, wherein the monitoring loop has one correlation device each for each applied signal significant of the performance from the signal set or a correlation device for all the applied signals significant of performance, in which device or devices the applied signals significant of the performance are conditioned for the purpose of better comparison with the performance signal.

12. The device as claimed in claim 11, wherein each correlation device is assigned a subtraction unit in which, from each conditioned signal significant of the performance, a typical amount is subtracted as correlation inaccuracy, in order that each correlated signal from the signal set is somewhat smaller than the performance signal under normal operating conditions.

13. The device as claimed in claim 8, wherein a signal failure and plausibility testing device is provided, which monitors the signals significant of the performance for at least one of signal failure and plausibility of the correlation with the performance signal in relation to excessively low values.

* * * * *